United States Patent
Chiu et al.

(10) Patent No.: US 7,573,213 B2
(45) Date of Patent: Aug. 11, 2009

(54) MOTOR DRIVING METHOD AND DEVICE THEREOF

(75) Inventors: Chun-Lung Chiu, Taoyuan Hsien (TW); Ming-Shi Tsai, Taoyuan Hsien (TW); Wen-Shi Huang, Taoyuan Hsien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 0 days.

(21) Appl. No.: 11/480,389

(22) Filed: Jul. 5, 2006

(65) Prior Publication Data

US 2007/0040519 A1 Feb. 22, 2007

(30) Foreign Application Priority Data

Aug. 19, 2005 (TW) .............................. 94128351 A

(51) Int. Cl.
*H02P 1/54* (2006.01)
(52) U.S. Cl. .................. 318/106; 180/216; 136/205
(58) Field of Classification Search ................ 318/106; 180/216; 136/205
See application file for complete search history.

(56) References Cited

U.S. PATENT DOCUMENTS

| | | | | |
|---|---|---|---|---|
| 4,602,694 A * | 7/1986 | Weldin .................. 180/2.2 |
| 5,237,263 A * | 8/1993 | Gannon .................. 323/288 |
| 5,343,970 A * | 9/1994 | Severinsky .............. 180/65.2 |
| 5,414,306 A * | 5/1995 | Kanno et al. ............... 307/87 |
| 5,680,907 A * | 10/1997 | Weihe .................... 180/2.2 |
| 5,684,385 A * | 11/1997 | Guyonneau et al. ........ 307/46 |
| 5,894,898 A * | 4/1999 | Catto .................... 180/2.2 |
| 5,914,869 A * | 6/1999 | Troiano .................. 363/61 |
| 6,021,862 A * | 2/2000 | Sharan ................... 180/216 |
| 6,060,790 A * | 5/2000 | Craig, Jr. ................ 307/71 |
| 6,064,937 A * | 5/2000 | Yang ...................... 701/93 |
| 6,098,733 A * | 8/2000 | Ibaraki et al. ............. 180/65.2 |
| 6,262,494 B1 * | 7/2001 | Tsukuni et al. ............. 307/80 |
| 6,376,932 B1 * | 4/2002 | Yang ...................... 307/66 |
| 6,426,601 B1 * | 7/2002 | De Filippis et al. ......... 318/139 |
| 6,462,493 B2 * | 10/2002 | Lan ....................... 318/272 |
| 6,583,522 B1 * | 6/2003 | McNulty et al. ............ 307/71 |
| 6,622,804 B2 * | 9/2003 | Schmitz et al. ............ 180/65.2 |
| 6,708,789 B1 * | 3/2004 | Albuquerque De Souza E Silva ....... 180/65.2 |
| 6,874,592 B2 * | 4/2005 | Yokotani et al. ............ 180/205 |
| 6,964,631 B2 * | 11/2005 | Moses et al. ............... 477/3 |

\* cited by examiner

*Primary Examiner*—Bentsu Ro
*Assistant Examiner*—David S Luo
(74) *Attorney, Agent, or Firm*—Birch, Stewart, Kolasch & Birch, LLP

(57) ABSTRACT

The invention provides a motor driving device including a converter receiving and converting a non-electrical power source, such as light, heat, mechanical or chemical energy, to a first electrical power, and a selector electrically connected between the converter and a motor, for receiving the first electrical power and a second electrical power from a power source, such as an electrical power generator, and outputting the first or second electrical power according to a rotation speed of the motor.

19 Claims, 2 Drawing Sheets

MOTOR DRIVING METHOD AND DEVICE THEREOF

CROSS REFERENCE TO RELATED APPLICATIONS

This Non-provisional application claims priority under U.S.C.§ 119(a) on Patent Application No(s). 094128351 filed in Taiwan, Republic of China on Aug. 19, 2005, the entire contents of which are hereby incorporated by reference.

BACKGROUND OF THE INVENTION

1. Field of the Invention

The invention relates to a motor driving method and more particularly to a motor driving method and device utilizing both non-electrical and electrical power sources.

2. Brief Discussion of the Related Art

Due to global energy reserves and frequently shown warnings about energy crisis, currently, more and more researchers are looking for alternatives to finite energy resources such as oil and coal, for electrical power generation. Among the alternatives, the most popularly and widely used are solar and heat energy, applied to electrical power generation for various kinds of electronic devices and units.

FIG. 1 shows a DC fan device 10, including a motor 12 and a converter 11. The converter 11 receives and converts a non-electrical power source 13, such as solar or heat energy, to an electrical power so as to be inputted to and drive the motor 12, such that a DC fan device 10 is allowed to provide heat dissipation.

However, the converter 11 suffers low power conversion efficiency corresponding to circuit dimension, i.e. the power generated per unit dimension is limited, such that the rotational speed of motor 12 is limited and usually insufficient for requirements.

SUMMARY OF THE INVENTION

The invention provides a motor driving method, including receiving a non-electrical power source, converting the non-electrical power source to a first electrical power, receiving a second electrical power, and selecting the first or second electrical power as input, according to a rotation speed of a motor. The motor receives the first electrical power when the motor rotates at a low speed, and receives the second electrical power when the motor rotates at a high speed or a full speed.

The invention further provides a motor driving device including a converter for receiving and converting a non-electrical power source, such as light, heat, mechanical or chemical energy, to a first electrical power, and a selector electrically connected between the converter and the motor for receiving the first electrical power and a second electrical power from a power source, such as an electrical power generator, and outputting the first or second electrical power according to a rotation speed of a motor. The motor receives the first or second electrical power selectively, so as to achieve operating efficiently and conserving power.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

Figure 1:
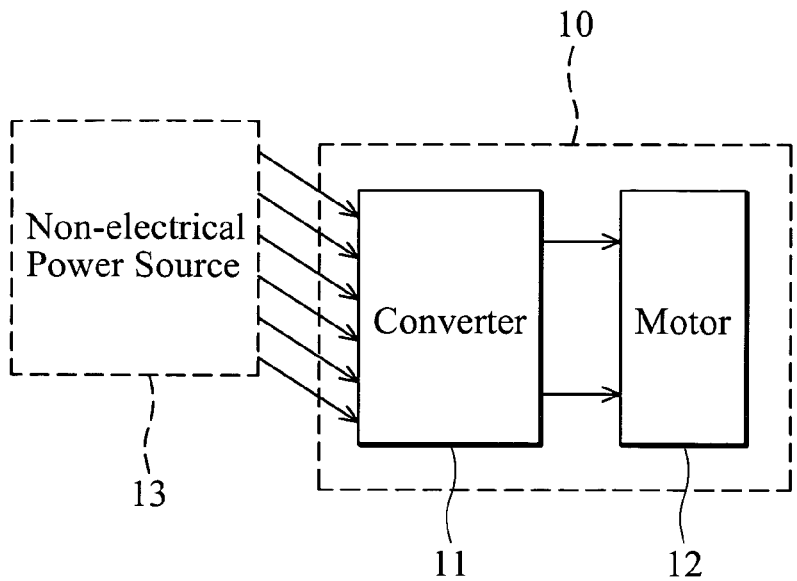
FIG. 1 is a block diagram showing a conventional circuit converts an non-electrical power to an electrical power so as to drive a motor.
Figure 2:
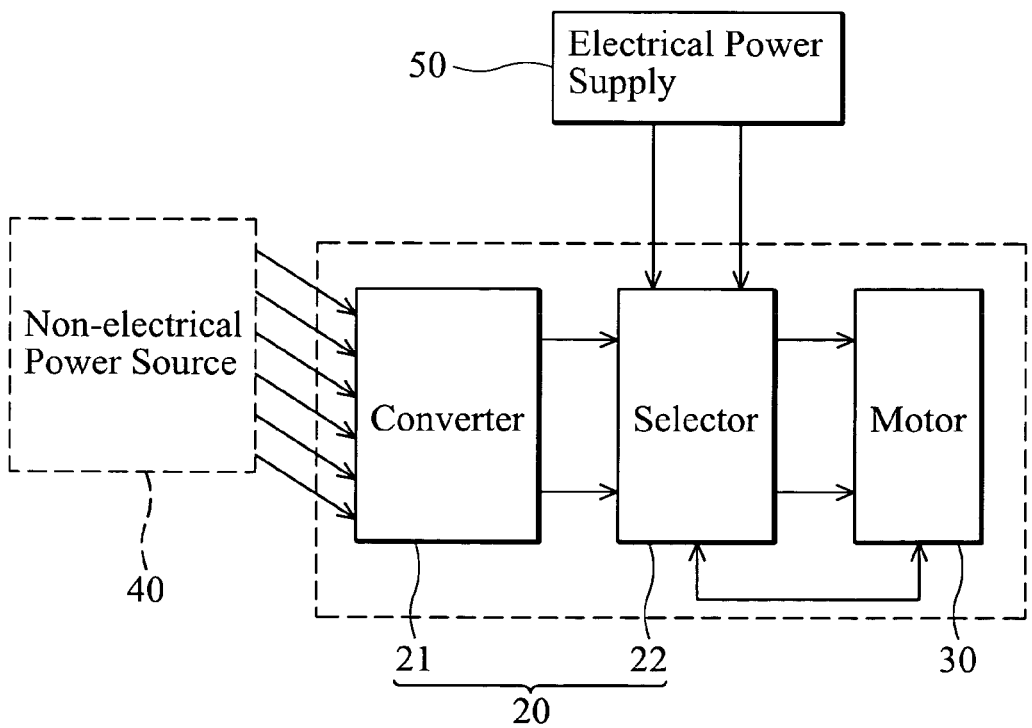
FIG. 2 is a block diagram showing a motor driving device according to an embodiment of the invention.

FIG. 2 shows a motor driving device according to an embodiment of the invention. As shown in FIG. 2, a driving device 20 is electrically connected to a motor 30 and drives the motor 30 so as to control the rotation speed of the motor 30.

In this embodiment, the diving device 20 mainly includes a converter 21 and a selector 22. The converter 21 receives and converts a non-electrical energy, such as light, heat, mechanical or chemical energy, into a first electrical power so as to be inputted to the selector 22.

The selector 22 is electrically connected to an electrical power supply 50 which generates a second electrical power so as to be inputted to the selector 22.

The selector 22 can select the first electrical power or the second electrical power as output according to a feedback signal from the motor 30. In general, the first electrical power has less energy than the second electrical power because the first electrical power has been processed by conversion. Thus, the first electrical power is suitable for a low speed rotation of the motor 30. On the other hand, the second electrical power can be designed for full-speed rotation of the motor 30, such that the selector 22 can be set to output the second electrical power when the motor 30 rotates at a full speed or at a high speed or a full speed.

Figure 3:
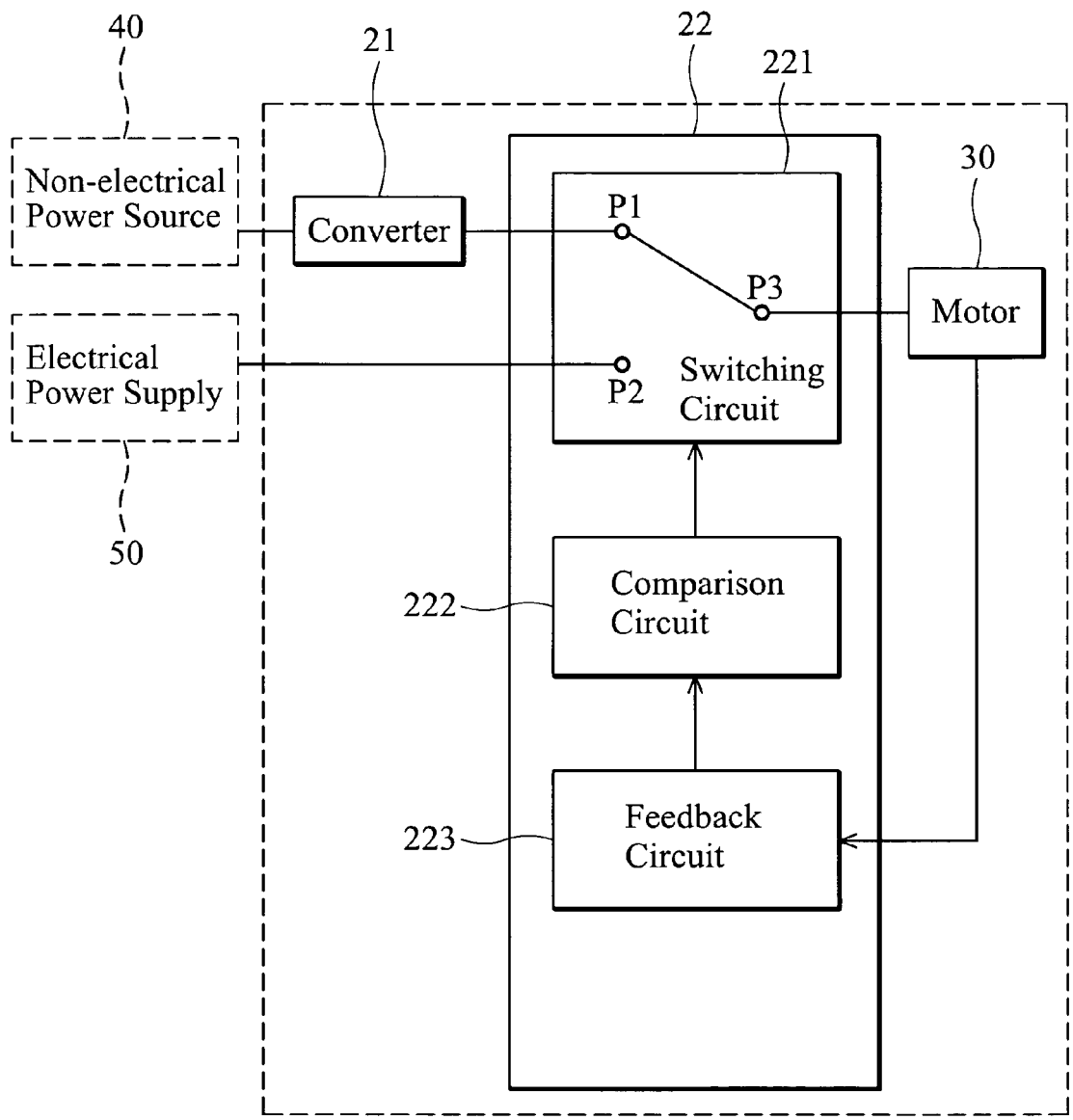
FIG. 3 is a block diagram showing a comparator of FIG. 2.

FIG. 3 is a more detailed block diagram of the selector 22 of FIG. 2. As shown in FIG. 3, the selector 22 includes a switching circuit 221, a comparison circuit 22, a converter 21, and a feedback circuit 223. The switching circuit 221 is electrically connected to the converter 21, the electrical power supply 50 and the motor 30. The feedback circuit 223 is electrically connected to the motor 30, and the comparison circuit 222 is electrically connected between the switching circuit 221 and the feedback circuit 223.

The switching circuit 221 has a first terminal P1, a second terminal P2 and a third terminal P3. The first terminal P1 is electrically connected to the converter 21. The second terminal P2 is electrically connected to the electrical power generator 50. The third terminal P3 is electrically connected to the motor 30. The third terminal P3 can be selectively connected to the first terminal P1 or the second terminal P2. The first electrical power is received from the converter 21 when the third terminal P3 is connected to the first terminal P1. Or, the second electrical power is received from the electrical power generator 50 when the third terminal P3 is connected to second terminal P2.

The feedback circuit 223 receives a feedback signal from the motor 30. The feedback signal can be a rotational speed or a current signal. The feedback circuit 223 converts the rotational speed or the current signals to a voltage signal so as to be inputted to the comparison circuit 222.

The comparison circuit 222 can include a comparator (not shown). The voltage signal outputted by the feedback circuit 223 is compared with a reference voltage therein, such that the switching circuit 221 can determine the third terminal P3 to connect to either the first terminal P1 or the second terminal P2 according to the compared result.

A method of controlling driving device 20 and the motor 30 is disclosed below. When the motor 30 rotates at a low speed, the motor 30 outputs a feedback signal to the feedback circuit 223 for conversion to a voltage signal compared by the comparing circuit 222, such that the third terminal P3 of the switching circuit 221 connects to the first terminal P1, and then the first electrical power from the converter 21 is outputted to the motor 30. When the motor 30 rotates at a high speed, the feedback signal alters the output to the feedback circuit 223 and the comparison circuit 222, and directs the third terminal P3 of the switching circuit 221 to connect to the second terminal P2, and then the second electrical power from the electrical power generator 50 is outputted to the motor 30. Since the second electrical power is designed for full-speed rotation of the motor 30 or as a variable voltage, the motor 30 can switch to a full speed rotation gradually or directly from a low-speed rotation when the motor 30 receives the second electrical power. The motor 30 can thus receive the first electrical power from the converter 21 or the second electrical power from the electrical power generator 50, selectively, thereby providing more efficient operation and power conversion.

Further, the motor 30 can be implemented in heat dissipation fans. When the environmental temperature is low, the motor 30 rotates at a low speed and received the first electrical power from the converter 21. As environmental temperature rises, the motor 30 increases the rotating speed for better heat dissipation, and the second electrical power from the electrical power generator 50 is received to increase the rotation speed accordingly.

However, the motor 30 is not limited thereto, not only being applied to heat dissipation fans, but also being applied to other applications without departing from the scope and spirit of this invention.

While the invention has been described by way of example and in terms of preferred embodiment, it is to be understood that the invention is not limited thereto. Those skilled in the technology can still make various alterations and modifications without departing from the scope and spirit of this invention. Therefore, the scope of the present invention shall be defined and protected by the following claims and their equivalents.

What is claimed is:

1. A motor driving method, comprising:
   receiving a non-electrical power source;
   converting the non-electrical power source to a first electrical power;
   receiving a second electrical power;
   selecting the first or second electrical power as input according to a rotation speed of a motor, while the motor is operating; and
   generating a feedback signal to a selector of the motor so as to allow the selector to select the first or second electrical power as output.

2. The motor driving method as claim 1, wherein the non-electrical power source is solar energy, light energy, heat energy, mechanical energy, or chemical energy.

3. The motor driving method as claim 1, wherein the first electrical power is selected as input when the motor rotates at a low speed.

4. The motor driving method as claim 1, wherein the second electrical power is selected as input when the motor rotates at a high speed or a full speed.

5. The motor driving method as claim 1, wherein the motor is a fan motor.

6. A motor driving device, electrically connected to a motor, comprising:
   a converter receiving and converting a non-electrical power source to a first electrical power; and
   a selector electrically connected between the converter and the motor for receiving the first electrical power and a second electrical power, and outputting the first or second electrical power according to a rotation speed of a motor, while the motor is operating, wherein the motor generates a feedback signal to the selector so as to allow the selector to select the first or second electrical power as output.

7. The motor driving device as claim 6, wherein the non-electrical power source is solar energy, light energy, heat energy, mechanical energy, or chemical energy.

8. The motor driving device as claim 6, wherein the first electrical power is outputted by the selector when the motor rotates at a low speed.

9. The motor driving device as claim 6, wherein the second electrical power is outputted by the selector when the motor rotates at a high speed or a full speed.

10. The motor driving device as claim 6, wherein the second electrical power is provided by an electrical power supply.

11. The motor driving device as claim 6, wherein the feedback signal is a rotation speed signal or a current signal.

12. The motor driving device as claim 11, wherein the rotation speed signal or the current signal is converted to a voltage signal.

13. The motor driving device as claim 6, wherein the selector has a switching circuit for receiving and outputting the first and second electrical power selectively.

14. The motor driving device as claim 13, wherein the selector has a feedback circuit for receiving and converting a feedback signal of the motor to be output to the switching circuit so as to allow the selector to select the first or second electrical power as output.

15. The motor driving device as claim 14, wherein the selector has a comparison circuit electrically connected between the feedback circuit and the switching circuit for receiving and comparing the converted feedback signal with a reference voltage, and outputting a comparison signal to the motor so as to allow the selector to select the first or second electrical power as output.

16. The motor driving device as claim 14, wherein the feedback signal is a rotation speed signal or a current signal.

17. The motor driving device as claim 16, wherein the rotation speed signal or the current signal is converted to a voltage signal.

18. The motor driving device as claim 6, wherein the motor is a fan motor.

19. A motor driving device for saving energy, electrically connected to a motor, comprising:
- a converter receiving and converting a non-electrical power source to a first electrical power; and
- a selector electrically connected between the converter and the motor for receiving the first electrical power and a second electrical power, and outputting the first or second electrical power according to a rotation speed of a motor, while the motor is operating, wherein the first electrical power is outputted by the selector when the motor rotates at a low speed to save energy, and wherein the motor generates a feedback signal to the selector so as to allow the selector to select the first or second electrical power as output.

* * * * *